United States Patent
Yoon et al.

(10) Patent No.: US 10,360,313 B2
(45) Date of Patent: Jul. 23, 2019

(54) APPARATUS AND METHOD FOR GENERATING 3D PRINTING MODEL USING MULTIPLE TEXTURES

(71) Applicant: ELECTRONICS AND TELECOMMUNICATIONS RESEARCH INSTITUTE, Daejeon-si (KR)

(72) Inventors: Seung Uk Yoon, Daejeon-si (KR); Seong Jae Lim, Daejeon-si (KR); Hye Ryeong Jun, Daejeon-si (KR); Bon Woo Hwang, Daejeon-si (KR); Chang Joon Park, Daejeon-si (KR); Jin Sung Choi, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 217 days.

(21) Appl. No.: 15/409,825

(22) Filed: Jan. 19, 2017

(65) Prior Publication Data
US 2017/0255714 A1 Sep. 7, 2017

(30) Foreign Application Priority Data
Mar. 3, 2016 (KR) .......... 10-2016-0025789

(51) Int. Cl.
*G06G 7/48* (2006.01)
*G06F 17/50* (2006.01)
(Continued)

(52) U.S. Cl.
CPC .............. *G06F 17/50* (2013.01); *B33Y 50/00* (2014.12); *B33Y 50/02* (2014.12); *G06F 17/5086* (2013.01); *B29C 64/393* (2017.08)

(58) Field of Classification Search
None
See application file for complete search history.

(56) References Cited

U.S. PATENT DOCUMENTS 8,579,620 B2 * 11/2013 Wu .................. G06T 17/00
358/3.11
2005/0093875 A1 * 5/2005 Zhang .............. G06T 11/001
345/582

(Continued)

FOREIGN PATENT DOCUMENTS

KR 10-1454780 B1 10/2014
KR 10-2015-0068895 A 6/2015

OTHER PUBLICATIONS

Hu Han et al., "3D Face Texture Modeling from Uncalibrated Frontal and Profile Images", International Conference on Biometrics: Theory, Applications and Systems, 2012.

(Continued)

*Primary Examiner* — Aniss Chad
*Assistant Examiner* — Nithya J. Moll
(74) *Attorney, Agent, or Firm* — LRK Patent Law Firm

(57) ABSTRACT

An apparatus for generating a 3D printing model using multiple textures includes a template model storage unit configured to store template models that are 3D models previously manufactured to be printable, a 3D model conversion unit configured to, upon receiving a 3D input model and a texture image, perform mesh deformation on the template model stored in the template model storage unit by using geometric information about the 3D input model, a texture processing unit configured to assign the texture image to the 3D model having being subjected to the mesh deformation, and a 3D printing model output unit configured to output a geometric model and a texture image of the template model which are finally calculated.

6 Claims, 6 Drawing Sheets

(51) Int. Cl.
*B33Y 50/02* (2015.01)
*B33Y 50/00* (2015.01)
*B29C 64/393* (2017.01)

(56) References Cited

U.S. PATENT DOCUMENTS

| | | |
|---|---|---|
| 2015/0172637 A1 | 6/2015 | Yoon et al. |
| 2015/0178988 A1* | 6/2015 | Montserrat Mora ... G06T 13/40 345/420 |
| 2015/0370958 A1* | 12/2015 | Arisoy ................ G06F 17/5086 700/98 |
| 2016/0019319 A1 | 1/2016 | Shtilerman |

OTHER PUBLICATIONS

Thomas Vetter et al., "Estimating coloured 3D face models from single images: An example based approach", European Conference on Computer Vision, LNCS 1407, pp. 499-513, 1998.

\* cited by examiner

APPARATUS AND METHOD FOR GENERATING 3D PRINTING MODEL USING MULTIPLE TEXTURES

CROSS-REFERENCE TO RELATED APPLICATION(S)

This application claims priority to Korean Patent Application No. 10-2016-0025789, filed on Mar. 3, 2016, in the Korean Intellectual Property Office, the disclosure of which is incorporated herein by reference in its entirety.

BACKGROUND

1. Field

The following description relates to a three dimensional (3D) printing technology, and more particularly, to an apparatus and a method for generating a 3D model.

2. Description of Related Art

In the recent years, 3D printing technologies are drawing attention, and content when using a 3D printer becomes more and more important. As for a method of generating 3D content, a mobile device equipped with a depth sensor, a stereo camera, etc. or a handheld 3D scanner using a laser, visible rays is widely used while serving important roles.

Also, there is an increasing use for a method in which surroundings of an object are imaged using a single camera and a 3D model is generated based on the images and a method in which a plurality of cameras are installed and a model is imaged by the plurality of cameras at one time.

However, with the 3D content generating method diversified, various devices and apparatuses use different geometric information reconstruction methods, different texture forms, and different output file formats. In addition, scan data having a great amount of errors and being heavy is not easy to use directly for a 3D printing, and thus a post-processing is needed. In particular, a texture, a major factor for determining the quality of a final printout of 3D printing, is processed in different methods depending on devices, but the method is not even open to the public, so that there is difficulty in the post processing.

As for most existing 3D model-based texture processing methods, assuming that there is given a 3D model and a texture image which matches the 3D model, a correspondence between a 3D model and a texture image is found, and texture mapping is performed using the correspondence. Such a method is applicable to the traditional scanning technique in which a 3D model is reconstructed, an image is captured in front of the 3D model, and the image is assigned to texture, but is not applicable to textures used in the currently emerging 3D model generating methods, for example, multiple textures, texture segments, and randomly located textures.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an apparatus and a method for generating a 3D printing model using multiple textures, capable of generating a final 3D model usable with 3D printing regardless of the form of a texture, including not only multiple textures but also various other types of textures usable in the current 3D model generating schemes, such as a mobile device and a hand held scanner.

In one general aspect, an apparatus for generating a 3D printing model using multiple textures includes a template model storage unit, a 3D model conversion unit, a texture processing unit, and a 3D printing model output unit. The template model storage unit may be configured to store template models that are 3D models previously manufactured to be printable. The 3D model conversion unit may be configured to, upon receiving a 3D input model and a texture image, perform mesh deformation on the template model stored in the template model storage unit by using geometric information about the 3D input model. The texture processing unit may be configured to assign the texture image to the 3D model having being subjected to the deformation. The 3D printing model output unit may be configured to output a geometric model and a texture image of the template model which are finally calculated.

The correspondence setting unit may be configured to calculate a correspondence between the 3D input model and the template model having finished the mesh deformation, and search for a triangle of the deformed model which corresponds to each vertex of the 3D input model. The validity check unit may be configured to compare a reconstruction area of the 3D input model with a reconstruction area of the template model to calculate a part of texture areas of the template model to which a texture needs to be newly assigned. The texture warping unit may be configured to warp a triangle of the input texture image into a triangle of a texture of the template model with respect to a valid area based on the set correspondence. The color matching unit may be configured to transform a remaining part of the texture areas of the template model to have a same color as a color of the texture of the input model.

The validity check unit may set a minimum area in consideration of a viewing direction of a user and a normal direction of a model.

The texture warping unit may calculate a vertex value through interpolation with respect to inside of a triangle of the template model corresponding to the input 3D model.

In another general aspect, a method for generating a 3D printing model using multiple textures includes: receiving a 3D input model and a texture image; performing mesh deformation on a template model that is a 3D model previously manufactured to be printable, by using geometric information about the 3D input model; assigning the texture image to the 3D model having being subjected to the mesh deformation; and outputting a geometric model and a texture image of the template model which are finally calculated.

The assigning of the texture image may include: calculating a correspondence between the 3D input model and the template model having completed the mesh deformation, and searching for a triangle of the deformed model which corresponds to each vertex of the 3D input model; calculating a part of texture areas of the template model to which a texture needs to be newly assigned by comparing a reconstruction area of the 3D input model with a reconstruction area of the template model; warping a triangle of the input texture image into a triangle of a texture of the template model with respect to a valid area based on the set correspondence; and transforming a remaining part of the texture areas of the template model to have a same color as a color of the texture of the input model.

The calculating of a part of texture areas of the template model to which a texture needs to be newly assigned may include setting a minimum area in consideration of a viewing direction of a user and a normal direction of a model.

The warping of a triangle of the input texture image into a triangle of a texture of the template model may include calculating a vertex value through interpolation with respect to inside of a triangle of the template model corresponding to the input 3D model.

Other features and aspects will be apparent from the following detailed description, the drawings, and the claims.

Figure 1:
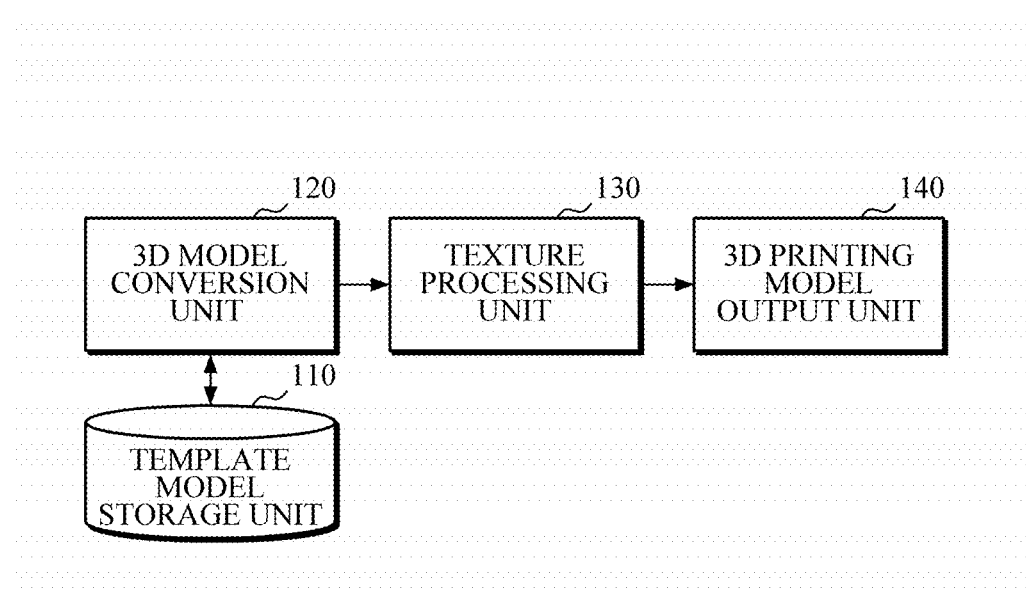
FIG. 1 is a block diagram illustrating a configuration of an apparatus for generating a 3D printing model using multiple textures according an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Exemplary embodiments of the present invention will be described in detail below with reference to the accompanying drawings to assist the reader in gaining a comprehensive understanding of the methods, apparatuses, and/or systems described herein.

In describing the present invention, detailed descriptions that are well-known but are likely to make the subject matter of the present invention unclear will be omitted in order to avoid redundancy.

The terminology used herein is defined in consideration of its function in the present invention, and may vary with an intention of a user and an operator or custom. Accordingly, the definition of the terms should be determined based on overall contents of the specification.

FIG. 1 is a block diagram illustrating a configuration of an apparatus for generating a 3D printing model using multiple textures according an embodiment of the present invention.

Referring to FIG. 1, an apparatus for generating a 3D printing model using multiple textures (hereinafter, referred to as 'an apparatus') includes a template model storage unit 110, a 3D model conversion unit 120, a texture processing unit 130, and a 3D printing model output unit 140.

The template model storage unit 110 stores template models that are 3D models previously manufactured to be printable.

The 3D model conversion unit 120, upon receiving a 3D input model and a texture image, performs mesh deformation on the template model stored in the template model storage unit 110 by using geometric information about the 3D input model. That is, a template model configured for 3D printing is transformed to a 3D input model. The template model is a template model having an appearance maximally similar to that of the input 3D model and manufactured in consideration of characteristics of 3D printing, and thus is suitable for 3D printing. In addition, the input 3D model and the input texture image may represent a 3D model and a texture image that are obtained by any one of various 3D model generating methods.

Figure 2A:
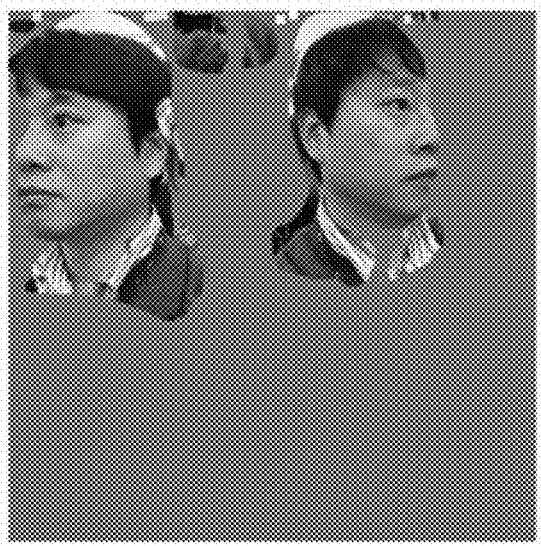
FIGS. 2A and 2B are diagrams illustrating examples of a texture image.
Figure 2B:
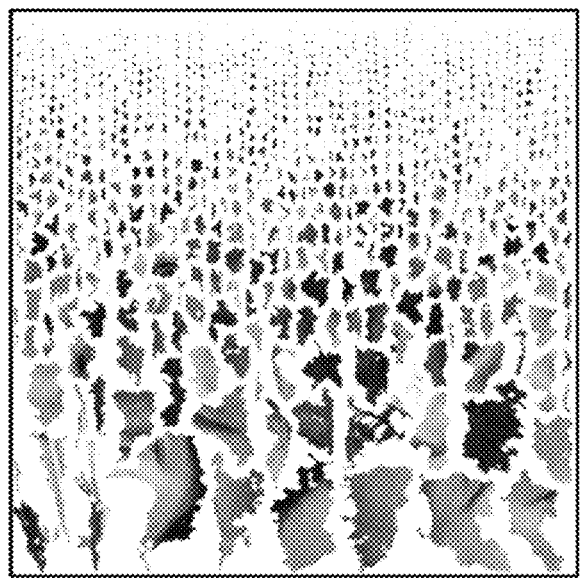

One of the most important criteria for determining the degree of transformation is texture information. However, unless a limitation is put on an input scheme, the texture processing method may vary with the form of an input texture image. The conventional technology is largely divided into a texture processing method used when a texture image and a 3D geometric model are given without information about a camera and a texture processing method used when information about a camera is given and a correspondence between a texture image and a geometric model is calculated and then texture mapping is performed. In other words, theses methods are suggested by assuming an input texture image that represents an appearance and a 3D model that corresponds to the texture image, and various approaches are present to increase the accuracy of the mapping, for example, parameterization, remeshing, and so on. However, when an input texture image is provided in the form of multiple textures calculated from a plurality of pictures or is obtained using respective own texture acquisition methods of individual devices, a texture image is acquired in a totally different form from a texture image that has been conventionally input and used. FIGS. 2A and 2B are diagrams illustrating examples of a texture image that are different from the conventional texture images. The conventional texture processing method have difficulty in assigning the texture images shown in FIGS. 2A and 2B to a texture of a template model, and thus input texture image data is subject to limitation.

According to the present application, the texture processing unit 130 assigns to the mesh deformationed 3D model the texture image that has a random form rather than a consistent form used in the conventional technology. Details thereof will be described below with reference to FIGS. 2 and 3.

The 3D printing model output unit 140 outputs a geometric model and a texture image of the template model which are finally calculated.

Figure 3:
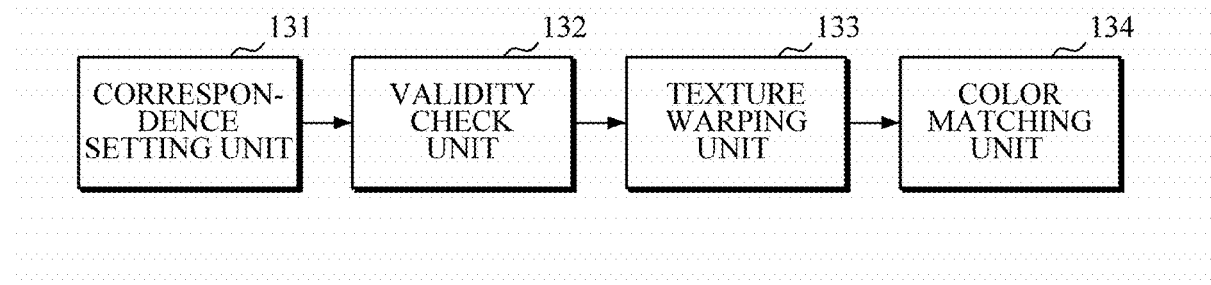
FIG. 3 is a detailed block diagram illustrating a texture processing unit according to an embodiment of the present invention.

FIG. 3 is a detailed block diagram illustrating a texture processing unit according to an embodiment of the present invention.

Referring to FIG. 3, the texture processing unit 130 includes a correspondence setting unit 131, a validity check unit 132, a texture warping unit 133, and a color matching unit 134.

The correspondence setting unit 131 calculates a correspondence between the 3D input model and the template model having finished the mesh deformation, and searches for a triangle of the deformed model which corresponds to each vertex of the 3D input model.

The validity check unit 132 compares a reconstruction area of the 3D input model with a reconstruction area of the template model to calculate a part of texture areas of the template model to which a texture needs to be newly assigned. According to an embodiment of the present invention, a minimum area is set in consideration of a viewing direction of a user and a normal direction of a model.

The texture warping unit 133 warps a triangle of the input texture image into a triangle of a texture of the template model with respect to a valid area based on the set correspondence. According to an embodiment of the present invention, considering that an input model is generally heavy and includes a number of triangles, vertex values are calculated by performing interpolation with respect to inside of a triangle of the template model corresponding to the input model.

That is, upon the mesh deformation of the template model, the template model is arranged at the same position as that of the input model, and is transformed to have an appearance maximally similar to that of the input model. Thereafter, through calculation of a correspondence, the texture of the input model is deformed to the template model.

The color matching unit 134 transforms a remaining part of the texture areas of the template model to have a color identical to a color of the texture of the input model. Since the texture of the input model is assigned to only a part of the texture areas of the template model, the color matching unit 134 changes the remaining part to have a color identical to that of the texture of the 3D input model.

Figure 4:
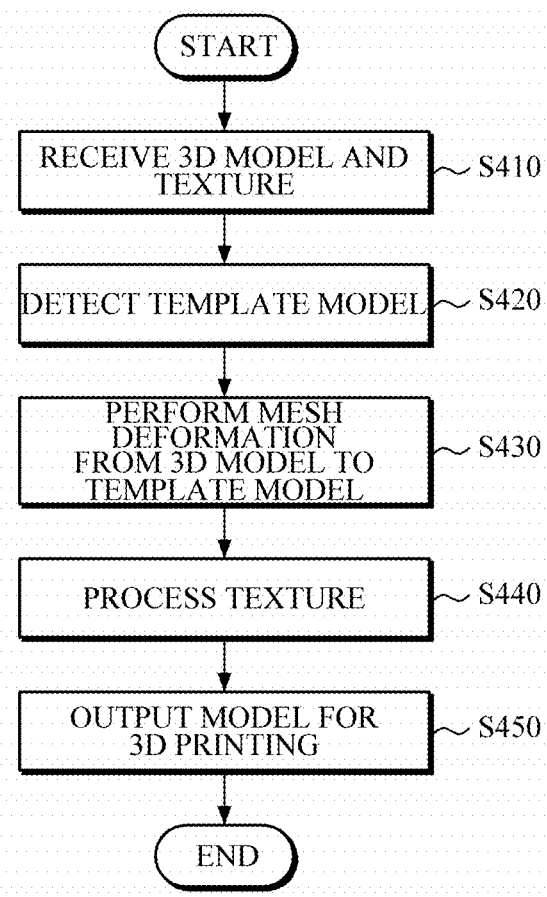
FIG. 4 is a flowchart for describing a method for generating a 3D printing model using multiple textures according to an embodiment of the present invention.

FIG. 4 is a flowchart for describing a method for generating a 3D printing model using multiple textures according to an embodiment of the present invention.

Referring to FIG. 4, an apparatus, upon receiving a 3D input model and a texture image (S410), detects a template model which is a 3D model previously manufactured to be printable and having an appearance similar to that of the 3D input model (S420). Then, the apparatus performs mesh deformation on the detected template model by using geometric information about the 3D input model (S430). That is, a template model configured for 3D printing is transformed into a 3D input model. The template model is a template model which has an appearance maximally similar to an input 3D model and manufactured in consideration of characteristics of 3D printing, and thus is suitable for 3D printing. The input 3D input model and the input texture image may be a 3D model and a texture image that are obtained by any one of various 3D model generating methods.

Then, the apparatus assigns to the mesh deformationed 3D model the texture image that has a random form rather than a consistent form used in the conventional technology (S440). Details thereof will be described below with reference to FIG. 5.

The apparatus outputs a geometric model and a texture image which are finally calculated (S450).

Figure 5:
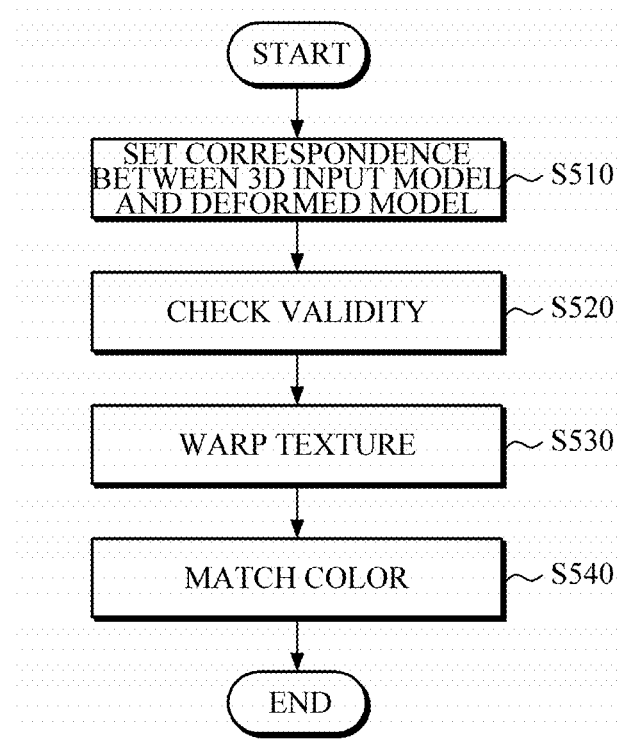
FIG. 5 is a flowchart for describing a texture processing operation according to an embodiment of the present invention.

FIG. 5 is a flowchart for describing a texture processing operation according to an embodiment of the present invention.

Referring to FIG. 5, the apparatus calculates a correspondence between the 3D input model and the template model having finished the mesh deformation, and searches for a triangle of the deformed model which corresponds to each vertex of the 3D input model (S510).

Then, the apparatus compares a reconstruction area of the 3D input model with a reconstruction area of the template model, and calculates a part of texture areas of the template model to which a texture needs to be newly assigned (S520). According to an embodiment of the present invention, a minimum area is set in consideration of a viewing direction of a user and a normal direction of a model.

Then, the apparatus warps a triangle of the input texture image into a triangle of a texture of the template model with respect to a valid area based on the set correspondence (S530). According to an embodiment of the present invention, considering that an input model is generally heavier and has a number of triangles, vertex values are calculated by performing interpolation with respect to inside of a triangle of the template model corresponding to the input model. That is, upon the mesh deformation of the template model, the template model is arranged at the same position as that of the input mode and is transformed to have an appearance maximally similar to that of the input model. Thereafter, the apparatus performs an operation of transferring the texture of the input model to the template model by calculating a correspondence.

The apparatus transforms a remaining part of the texture areas of the template model to have a color identical to a color of the texture of the input model (S540). In other words, the texture of the input model is assigned to only some part of the texture areas of the template model, and the apparatus changes the remaining part of the texture areas of the template model to have the same color as that of the texture of the 3D input model.

As is apparent from the above, when an input texture image is provided as a multiple texture calculated from a plurality of pictures or is obtained using respective own texture acquisition schemes of various 3D model acquisition apparatuses or systems, a texture image is output in a form that is totally different from a texture image having been used as an input in the existing technology. According to the existing approach, such a texture image is not easily assigned to a texture of a template model, and thus data of an input unit has limitations.

As to remove the above described constraints, the present invention allows newly emerging various 3D model acquisition schemes to be adopted in many ways and used in the 3D printing. Accordingly, user accessibility and data compatibility with regard to generating 3D printing content can be remarkably improved.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

What is claimed is:

1. An apparatus for generating a 3D printing model using multiple textures, the apparatus comprising:
   a mobile device; and further comprising:
   a template model storage unit configured to store template models that are 3D models previously manufactured to be printable;
   a 3D model conversion unit configured to, upon receiving a 3D input model and a texture image, perform mesh deformation on the template model stored in the template model storage unit by using geometric information about the 3D input model;
   a texture processing unit configured to assign the texture image to the 3D model having being subjected to the mesh deformation; and a 3D printing model output unit configured to output a geometric model and a texture image of the template model which are finally calculated, wherein the texture processing unit comprises:
   a correspondence setting unit configured to calculate a correspondence between the 3D input model and the template model having finished the mesh deformation, and search for a triangle of the deformed model which corresponds to each vertex of the 3D input model;

a validity check unit configured to compare a reconstruction area of the 3D input model with a reconstruction area of the template model to calculate a part of texture areas of the template model to which a texture needs to be newly assigned;

a texture warping unit configured to warp a triangle of the input texture image into a triangle of a texture of the template model with respect to a valid area based on the set correspondence; and a color matching unit configured to transform a remaining part of the texture areas of the template model to have a same color as a color of the texture of the input model.

2. The apparatus of claim 1, wherein the validity check unit sets a minimum area in consideration of a viewing direction of a user and a normal direction of a model.

3. The apparatus of claim 1, wherein the texture warping unit calculates a vertex value through interpolation with respect to inside of a triangle of the template model corresponding to the input 3D model.

4. A method for generating a 3D printing model using multiple textures, the method comprising:
receiving a 3D input model and a texture image; performing mesh deformation on a template model that is a 3D model previously manufactured to be printable, by using geometric information about the 3D input model;
assigning the texture image to the 3D model having being subjected to the mesh deformation; and outputting a geometric model and a texture image of the template model which are finally calculated, wherein the assigning of the texture image comprises:
calculating a correspondence between the 3D input model and the template model having completed the mesh deformation, and searching for a triangle of the deformed model which corresponds to each vertex of the 3D input model;
calculating a part of texture areas of the template model to which a texture needs to be newly assigned by comparing a reconstruction area of the 3D input model with a reconstruction area of the template model;
warping a triangle of the input texture image into a triangle of a texture of the template model with respect to a valid area based on the set correspondence; and
transforming a remaining part of the texture areas of the template model to have a same color as a color of the texture of the input model.

5. The method of claim 4, wherein the calculating of a part of texture areas of the template model to which a texture needs to be newly assigned includes setting a minimum area in consideration of a viewing direction of a user and a normal direction of a model.

6. The method of claim 4, wherein the warping of a triangle of the input texture image into a triangle of a texture of the template model includes calculating a vertex value through interpolation with respect to inside of a triangle of the template model corresponding to the input 3D model.

* * * * *